United States Patent Office 2,765,915
Patented Oct. 9, 1956

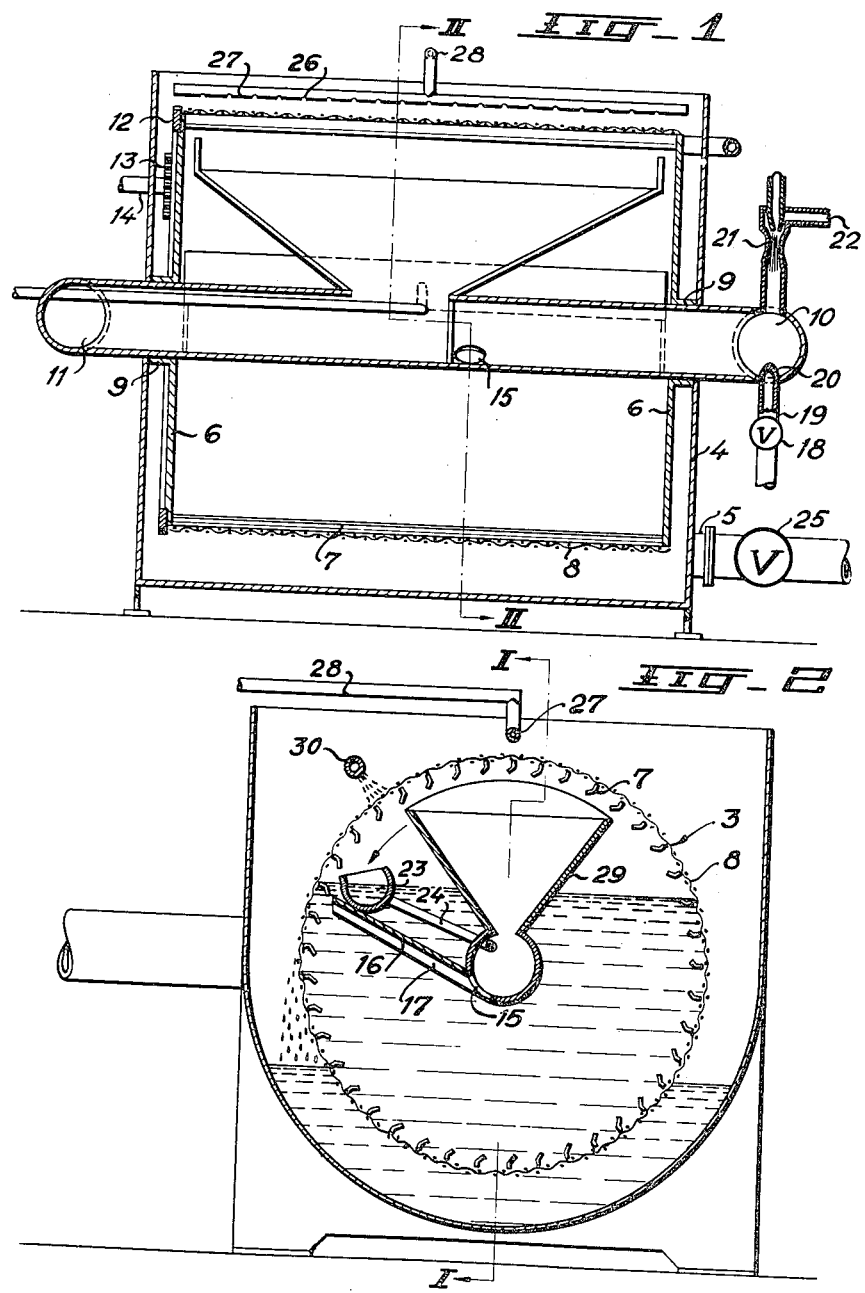

2,765,915
METHOD OF AND MEANS FOR RECOVERING FIBERS FROM PULP-WATER

Ivar Linus Nilsson, Vargon, Sweden

Application November 3, 1954, Serial No. 466,601

Claims priority, application Sweden November 16, 1953

12 Claims. (Cl. 210—43)

The invention relates to a method of and means for recovering fibres from pulp-water, such as backwater from paper-making machines.

It is known to concentrate fibre suspensions by means of a rotary filter drum into which the fibre suspension is introduced. The fibres settle in the form of a layer at the inside of the wire-gauze constituting the drum jacket and, by using suitable means, this layer is then successively removed and the wire-gauze cleansed above the liquid level in the drum. However, when such a device is to be used for recovering fibres from pulp-water, most of the finer fibres will pass the wire-gauze until a filtering layer of fibres has been formed at its inside. Thus, a certain amount of fibrous substance is lost and, moreover, the liquid filtered is not sufficiently purified before it is being discharged into the drains of the mill. Of course, the wire-gauze cannot be too close meshed, as thereby the filtering capacity of the device would be highly reduced.

According to the invention, this drawback is avoided by introducing a finely divided air flow into the fibre suspension supplied to the drum and conducting it towards the point where the rotary drum jacket is sunk below the liquid level. The finely divided air bubbles will then adhere to a great extent to the coarser fibres or lumps of fibres, which are thereby carried off, to be the first to hit the wire-gauze. Thus, a porous filtering layer is immediately formed, whereby the finer fibres are effectively retained.

Should the liquid to be filtered not contain a sufficient amount of coarser fibres, a small amount of a more concentrated suspension of substantially coarser fibres may be supplied to the point where the rotary drum jacket is sunk below the liquid level. If desired, the finely divided air may be supplied together with said suspension of coarser fibres before or at the inlet to the filter drum.

The invention also relates to a device for carrying out the method above referred to. The device is of the type which comprises a horizontal rotary filter drum having an axial inlet for liquid to be filtered and an axial outlet for concentrated pulp, means for removing concentrated pulp from the drum above the liquid level therein, and a funnel within the drum connected to the outlet and adapted to receive such concentrated pulp. The device according to the invention comprises means for introducing a finely divided air flow into the drum, in combination with a screen arranged to direct said flow to the point where the drum jacket passes down into the liquid. Preferably, means are provided for supplying a small amount of fibre suspension containing coarse fibres, as mentioned above.

The details of the method and the device according to the invention are hereinafter described by way of example, with reference to the accompanying drawings, in which:

Figures 1 and 2 show a suitable embodiment of the device, Figure 1 being a longitudinal section along the line I—I of Figure 2, and Figure 2 being a cross-section along the line II—II of Figure 1.

3 is a filter drum mounted in a vessel 4, provided with an outlet 5 near the bottom. The filter drum consists of two solid, circular end walls 6 joined by means of bars 7 which support the wire-gauze 8 forming the drum jacket. The wire-gauze may, for instance, have 100 meshes per inch. The two end walls are provided with hubs 9 journalled on fixed, horizontal tubes 10 and 11 which are inserted through the two opposite end walls of the vessel in axial alignment with each other. The rotation of the drum at a low speed may be effected by means of a gear comprising for instance, a toothed rim 12 secured to one end wall of the drum and engaging with a pinion 13 mounted on a driving shaft 14 introduced through the wall of the vessel.

The tube 10 is adapted to supply the pulp-water to the interior of the filter drum, for which purpose it has an outlet opening 15 located approximately at the middle of the drum and directed obliquely downwards at the side of the tube which is turned towards the part of the drum surface that moves downwards during the rotation. A screen 16, directed approximately radially and sloping inwards towards the centre of the drum, has one of its edges fixed to the two tubes 10, 11 above the opening 15, while its opposite edge ends a short distance from the bars 7. The screen extends substantially along the whole inner length of the drum and is supported by two brackets 17, also fixed to the tubes 10, 11.

A conduit 19 having a shut-off valve 18 and leading from a source of compressed air is connected to a spraying nozzle 20 inserted in the tube 10 outside the container 4. Alternatively, finely divided air may be supplied mixed with a suspension of coarse fibres. For this purpose a jet pump 21 is connected to the tube 10 outside the container. The fibre suspension is supplied to the jet pump from a storage container by means of a pump (not shown), air being thereby sucked through the inlet 22. Further, a trough 23 for supplying liquid containing coarse fibres may be mounted along the inner periphery of the drum above the screen 16. The trough is arranged to slope outwards towards the wire-gauze and a conduit 24, inserted through the tube 11, connects the trough to a storage container over a pump (not shown).

The filter drum 3 shown in Figure 2 is adapted to rotate anti-clockwise at a low speed. It may be mentioned, by way of example, that a drum having a diameter of about 2 m. may rotate at a speed of about 1 R. P. M., i. e. at a peripheral speed of about 6 m./min. As mentioned above, the air bubbles introduced into the liquid will adhere to the coarse fibres and lumps of fibres, which thereby rise upwards when flowing through the opening 15, will follow the underside of the screen 16 towards the periphery of the drum, settling on the wire-gauze in the form of a porous layer. This layer of fibres, which is thus formed as soon as the wire-gauze is immersed below the liquid level, acts as a very good filter and retains effectively the finer fibres contained in the liquid.

The filtered liquid flowing off through the wire-gauze is collected in the surrounding vessel 4 and is tapped through the outlet 5. The liquid level within the drum is adjusted by means of a valve 25 inserted in the outlet conduit 5.

The above-mentioned bars 7 are intended to contribute in retaining the layer of fibres on the portion of the drum, which moves upwards through the liquid, and for this purpose they are slightly bent somewhat to form elevator buckets, as can be seen from Figure 2. When the layer of fibres that has been formed has been advanced to the upper portion of the drum, it is removed from the wire-gauze by means of compressed air directed onto the outside of the drum from a row of holes 26 in a pipe 27 connected to a pressure air conduit 28 and mounted above and parallel to the drum. The fibres fall down into a collecting funnel 29, the upper, wider portion of which extends substantially along the whole inner length of the drum. The lower end of the funnel is connected to the tube 11, and the concentrated pulp is passed through said tube to a storage container, not shown. The part of the wire-gauze that has passed over the funnel is hit by a spray of water from a row of holes in a water pipe 30 arranged along the drum and is thus cleansed from fibres still clinging, which might clog the meshes.

If the fibre suspension to be filtered contains a sufficient amount of coarse fibres for achieving the desired filtering effect, it is advantageous to supply the finely divided flow of air from the conduit 19. Generally, however, back-water contains substantially only finer fibres, and in this case it is necessary, as already mentioned, to add a small amount of a more concentrated suspension of coarser fibres, suitable for forming a filtering layer. Such a fibre suspension may, for instance, be obtained from a storage container located before the paper-making machine. Preferably, the liquid containing the coarse fibres is supplied by means of the jet pump 21, whereby the necessary amount of air is simultaneously sucked in and effectively mixed with the liquid. Alternatively, the suspension of coarse fibres may, instead, be supplied through the conduit 24 to the trough 23, the lower rim of which serves as an overflow outlet. If desired, both these arrangements may be used together.

To illustrate the effect reached by the invention it may be mentioned that, previously, it has seldom been possible to reach a lower amount of fibres than 30–40 mg./l. in the filtered waste water, although it has long been considered desirable to obtain a better purification. However, by means of the device described above it is possible, without any difficulty, to keep the amount of fibres in the waste water at about 10 mg./l., and in certain cases even such a low value as 2 mg./l. has been reached, i. e. a considerably lower amount of organic substance than is usually contained in natural waters.

What I claim is:

1. In the method of removing fibers from liquid including the steps of passing the mixture of fibers and liquid into a rotary filter drum, thereby causing the fibers to settle in the form of a layer along the lower inner surface thereof, and removing this layer after it emerges from the liquid, the improvement wherein a gas is introduced into the mixture before the mixture enters the drum, and wherein the surfacing fibers, arising by reason of gas adhering to them, are directed toward the downwardly moving side of the drum.

2. The method set forth in claim 1 wherein a concentrated mixture of fibers and liquid is added to the first mentioned mixture before said first mentioned mixture is passed into the drum.

3. The method set forth in claim 1 wherein a concentrated mixture of fibers and liquid is added to the first mentioned mixture adjacent the downwardly moving side of the drum.

4. The method of removing relatively fine fibers from a mixture of coarse and fine fibers and a liquid, including the steps of introducing a gas into the mixture, passing the mixture including the gas into a rotary filter drum, directing coarse fibers rising by reason of gas bubbles adhering thereto toward and adjacent to the downwardly moving side of the drum, thereby causing the coarser fibers to collect in a layer on the lower innersurface of the drum, and passing the liquid through the layer of coarse fibers and from the drum.

5. Apparatus for recovering fibers from liquid comprising a rotary filter drum mounted for rotation about a horizontal axis, said drum having an inlet for liquid to be filtered and means for discharging therefrom fibers removed from the liquid, means for introducing gas into the mixture of liquid and fibers upstream of said inlet, and means for directing surfacing fibers, arising by reason of gas adhering thereto, toward and adjacent to the downwardly moving side of the drum.

6. The apparatus set forth in claim 5 wherein the last mentioned means comprises a fixedly mounted imperforate element extending substantially across the length of said drum, said element being upwardly inclined toward said downwardly moving side of said drum.

7. The apparatus set forth in claim 6 wherein means is provided for introducing a concentrated mixture of fibers and the liquid upstream of said inlet.

8. The apparatus set forth in claim 5 wherein means is provided for introducing a concentrated mixture of fibers and liquid into said drum along the downwardly moving side thereof.

9. Apparatus for recovering fibers from liquid comprising a pair of fixedly mounted tubes each including a generally rectilinear portion, said portions being placed in axial alignment, a rotary filter drum carried by said portions of said tubes, said drum being rotatably mounted, means for rotating said drum, means sealing one tube from the other, port means formed in one of said tubes and located within said drum, means for introducing the mixture of fibers and liquid into said one tube, an inclined imperforate element fixedly mounted within said drum and extending along substantially the entire length of same, said port means being positioned below said element and said element being inclined upwardly from said port means toward the downwardly moving side of said drum, a funnel mounted within said drum, said funnel communicating with the interior of said other tube, means for directing fluid under pressure against the upper side of said drum for forcing fibers from the inner surface thereof into said funnel, and means for removing the fibers from said other tube.

10. The apparatus set forth in claim 9 including means for introducing gas into said one tube upstream of said port means.

11. The apparatus set forth in claim 10 including means for introducing a concentrated mixture of fibers and liquid into said one tube upstream of said port means.

12. The apparatus set forth in claim 9 including means for introducing a concentrated mixture of fibers and liquid along said downwardly moving side of said drum and adjacent to the upper end of said element.

References Cited in the file of this patent

UNITED STATES PATENTS

| 1,870,442 | Coley | Aug. 9, 1932 |
| 2,014,144 | Mensing | Sept. 10, 1935 |
| 2,679,477 | Kivari et al. | May 25, 1954 |